United States Patent [19]
Patel

[11] Patent Number: 5,765,916
[45] Date of Patent: Jun. 16, 1998

[54] MEMORY SEAT WITH SOFT AND HARD TRAVEL LIMITS

[75] Inventor: Dinesh Patel, Ann Arbor, Mich.

[73] Assignee: UT Automotive Dearborn, Inc., Dearborn, Mich.

[21] Appl. No.: 811,267

[22] Filed: Mar. 4, 1997

[51] Int. Cl.⁶ .................................................. A47C 1/02
[52] U.S. Cl. .................................................. 297/344.13
[58] Field of Search ........................... 297/344.1, 344.2, 297/344.13, 463.2, 337, 338, 339, 344.12, 344.14, 311, 330, 344.17, 362.11; 248/424, 429; 318/466, 468

[56] References Cited

U.S. PATENT DOCUMENTS

| | | | |
|---|---|---|---|
| 4,721,337 | 1/1988 | Tomita | 297/344.1 X |
| 5,285,193 | 2/1994 | Ogasawara | 318/466 |
| 5,292,178 | 3/1994 | Loose et al. | 297/344.1 |
| 5,348,373 | 9/1994 | Stiennon | 297/344.1 |
| 5,633,571 | 5/1997 | Huyer | 318/466 X |

*Primary Examiner*—Milton Nelson, Jr.
*Attorney, Agent, or Firm*—Howard & Howard

[57] ABSTRACT

A vehicle seat system includes a motor moving a seat along a path between mechanical limits. A sensor measures the position of the seat along the path. A control module defines a soft-limit when the sensor detects that movement of the seat has stopped for a first predetermined time interval, but the motor is activated. The control module subsequently ceases movement of the seat at the soft-limit when no movement of the seat is detected for a second predetermined time interval less than the first predetermined time interval, indicating a soft stall. The control module defines a hard-limit after a predetermined number of soft stalls. The control module subsequently ceases activation of the motor just before the seat reaches a hard-limit.

17 Claims, 3 Drawing Sheets

MEMORY SEAT WITH SOFT AND HARD TRAVEL LIMITS

BACKGROUND OF THE INVENTION

The present invention relates generally to a power vehicle seat having improved protection against motor wear caused by the seat contacting travel limits.

Many current vehicles include power seats having motors which selectively move along several paths between mechanical stops. Generally the seat is movable along a track horizontally between two track limits and along a vertical path between two stops. Further, the vehicle seat back can be reclined along an arcuate path between two stops. Upon activation of a user activated switch, a motor drives the seat in one direction until the mechanical limit of the seat travel is reached, at which time the motor continues to impart a force on the seat, but the seat does not continue to move. This condition creates wear on the motor.

On systems having seat memory modules, when the travel limit is contacted a first time, the motor strains for a certain period of time, such as two seconds, before switching off. That travel limit position is then stored in memory. During subsequent activations of the motor, the seat memory module will switch off the motor slightly before the seat reaches the defined travel limit. However, temporary obstacles to the vehicle seat travel, such as a package behind the vehicle seat may cause a limit to be defined. As a result, vehicle seat travel will be unnecessarily interrupted during subsequent activations when the obstacle is no longer present. The switch must be released and switched again to move the seat through the defined limit.

SUMMARY OF THE INVENTION

The present invention provides a vehicle seat system which protects seat motion motors against excessive wear due to contacting travel limits while preventing unnecessary interruption in seat travel caused by a temporary obstacle.

The vehicle seat system of the present invention generally comprises a seat movable along several paths each having a forward limit and a rearward limit. The seat is movable horizontally and vertically and the seat back can be reclined. The seat includes at least one motion motor moving the seat along each path and controlled by a memory seat module receiving an input from a user-activated switch. The motor moves the seat in either direction along the path between the forward travel limit and rearward travel limit. Travel by the seat is controlled by the user activated switch and the seat memory module. As is well known in the art, the seat can be manually adjusted with the user activated switch or can be automatically moved by the seat memory module to a previously stored position.

A sensor, such as a potentiometer or encoder mounted on the motor, indicates to the module when motion of the seat has stopped, thereby indicating that the seat has contacted either a mechanical limit or a temporary obstacle. During activation of the motor, when no motion is detected for a predetermined period of time, for example two seconds, the module switches off the motor and defines a soft-limit at the current position of the seat. When the seat is subsequently moved toward the soft-limit again, the module monitors the sensor. If the sensor indicates no seat movement for two seconds at another position prior to the previously defined soft-limit, the new position is defined as a soft-limit. If the seat movement is again stopped at the previously defined soft-limit for a second predetermined period of time less than the first predetermined period of time, such as 300 milliseconds, the module switches off the motor to prevent wear and increments a soft-limit counter. When the soft-limit counter exceeds a predetermined value, preferably 3, the module defines a hard-limit at that position. Subsequently, when the seat is moved toward the defined hard-limit, the module switches off the motor just prior to the seat reaching the hard-limit, thereby preventing motor wear.

If the motor moves the seat through a previously defined soft-limit, that soft-limit is deleted. Therefore, if the seat contacts a temporary obstacle, such as a package placed behind the seat, a soft-limit will be defined at that position. Subsequently, when the package is removed, the module will "look for" the soft-limit. If the temporary obstacle is removed, the motor will move the seat through the soft-limit, and the soft-limit will be deleted. Therefore, the vehicle seat system of the present invention will prevent excessive wear on the motion motor due to contacting travel limits, but will avoid unnecessary interruption in seat motion due to temporary obstacles.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF A PREFERRED EMBODIMENT

Figure 1:
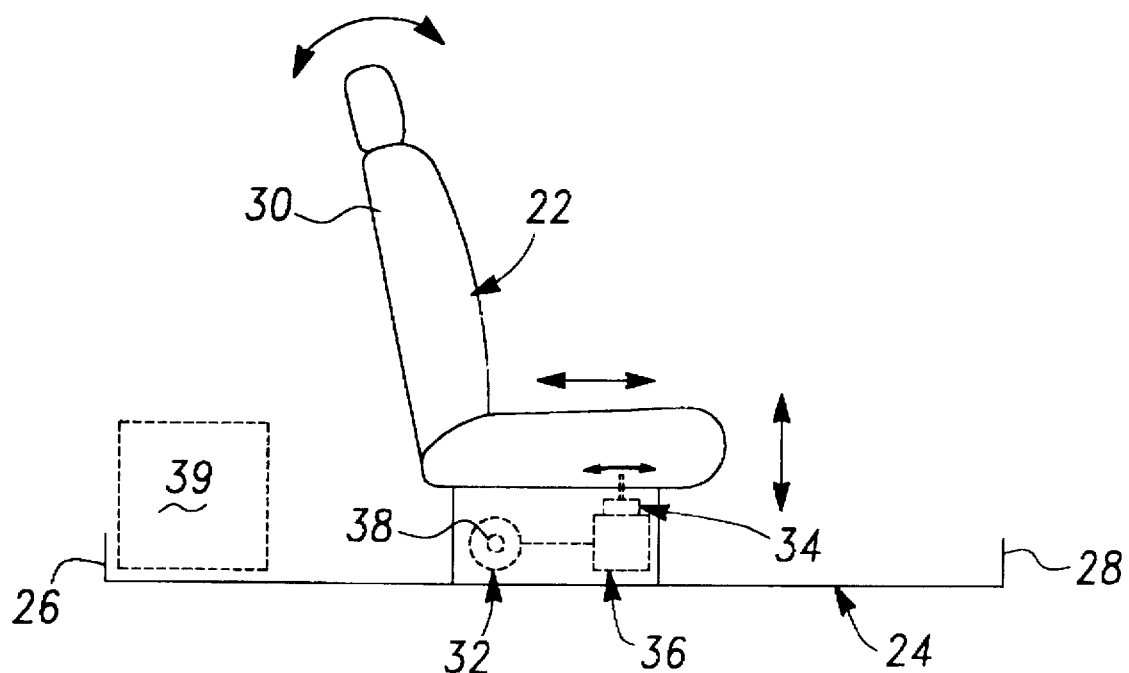
FIG. 1 is a schematic of the vehicle seat system of the present invention.

The vehicle seat system 20 of the present invention is shown generally in FIG. 1 comprising a seat 22 movable along a track 24 forwardly and rearwardly between a pair of mechanical stops, a rear track limit 26 and a front track limit 28. The seat 22 further includes a seat back 30 which is movable along an arcuate path to provide a reclining seat function. The seat 22 is also movable upwardly and downwardly along a vertical path. Each of these motions, horizontal slide, vertical and recline are powered by a motor 32 (one shown) controlled by a user activated switch 34 and a control module 36.

For illustrative purposes, the present invention will be described with respect to the horizontal slide function of the vehicle seat system 20, wherein the seat 22 moves along a horizontal path or track 24 between a pair of mechanical stops, a rear track limit 26 and a front track limit 28. The present invention would operate similarly for reclining the seat back 30 as the seat back 30 moves along arcuate path between a pair of mechanical stops. Further, the present invention operates similarly for vertical movement of the seat 22 along a vertical path between a pair of mechanical stops. Each motor 32 (only one shown) moves the seat 22 or seat back 30 along one of the paths as controlled by a user activated switch 34 and the control module. The control module preferably provides a seat memory function, as is well known in the art. Briefly, the horizontal and vertical position of the seat 22 and the recline position of the seat back 30 is stored in memory in the control module 36 for a specific user and can be retrieved, wherein the control module 36 moves the seat 22 to the previously stored horizontal and vertical position and returns the seat back 30 to the previously stored recline position. Alternatively, one or more user activated switches 34 can manually adjust the vertical and horizontal position of the seat 22 as well as the recline position of the seat back 30. A temporary obstacle 39 such as a package or box may also be placed between the seat 22 and one of the track limits 26 or 28.

The motor 32 preferably includes a sensor 38, such as a potentiometer which produces a signal to the control module 36 indicating the position of the seat 22 along the track 24.

In operation, the seat 22 is moved forwardly and rearwardly along the track 24 by the motor 32, as controlled by the user activated switch 34 and the control module 36 or, for a memory function, by the control module 36. The control module 36 receives a signal from the sensor 38 periodically, preferably every 10 milliseconds, indicating the position of the seat 22 along the track 24. The control module 36 monitors the sensor 38 to determine the position of the seat 22 along the track 24 between the rear track limit 26 and the front track limit 28. If during activation of the motor 32, the control module 36 detects that the sensor 38 has not changed during a first predetermined time interval, preferably 3 seconds, the control module 36 indicates a hard stall condition. This is caused by the seat 22 contacting a travel limit, i.e. either one of the track limits 26, 28 or the temporary obstacle 39. If the control module 36 defines a hard stall, the control module defines a soft-limit at that position. Subsequently, when the seat 22 is moved in the same direction towards the previously defined soft-limit, the control module 36 will cease operation of the motor 32 and set a soft-stall flag if motion of the seat 22 stops for a second predetermined time interval, less than the first predetermined time interval, preferably 300 milliseconds. If, on the other hand, the seat 22 moves through the previously defined soft-limit, the control module 36 deletes the previously stored soft-limit. If a predetermined number, preferably 3, of soft stalls are detected at the defined soft-limit, the control module 36 defines a hard-limit. When the seat 22 approaches a hard-limit, the control module 36 ceases operation of the motor 32 slightly before the hard-limit is reached, thereby reducing wear on the motor 32 and other components. The operation of the control module 36 is identical with respect to the motors controlling vertical motion of the seat 22 and the recline position of the seat back 30.

Figure 2:
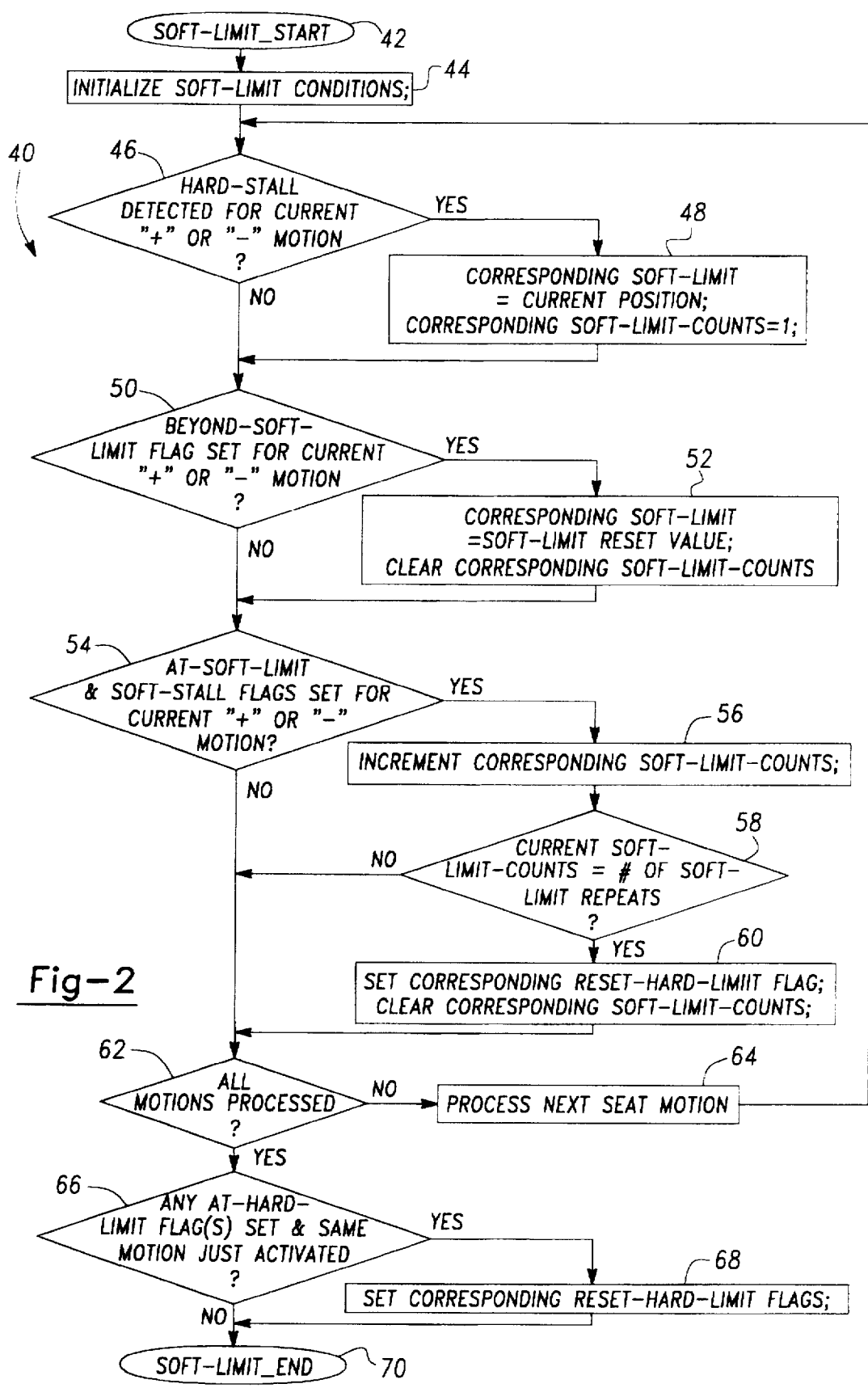
FIG. 2 is a flow chart indicating the operation of the control module of FIG. 1 in processing a soft-limit.

A soft-limit routine 40 of the control module 36 is shown in detail in FIG. 2. The soft-limit routine 40 starts in step 42 and initializes soft-limit conditions in step 44, including clearing any flags. In step 46, the control module 36 detects a hard stall for the current forward or rearward horizontal, vertical or recline motion. If a hard stall is detected in step 46, the corresponding soft-limit is set at the current seat 22 position in step 48. Further, in step 48, the corresponding soft-limit counts is set to equal 1.

If the control module 36 detects that the beyond-soft-limit flag is set for the current motion in step 50, the corresponding soft-limit is reset, deleting the previously stored soft-limit in step 52. Further, the corresponding soft-limit-counts is cleared.

In step 54, if the control module 36 detects that the seat 22 is at the previously stored soft-limit and a soft stall flag is set, activation of the motor 32 is ceased and the corresponding soft-limit-counts is incremented in step 56.

The current soft-limit-counts is tested in step 58 to determine whether it has exceeded a predetermined number of soft-limit repeats, preferably three. If the predetermined number of soft-limit-counts has been reached in step 58, a reset-hard-limit flag is set in step 60 and the corresponding soft-limit-counts are cleared. If all motions have not been processed, i.e. horizontal motor, vertical motion and recline motion, the control module processes the next seat motion is step 64, returning to step 46. If all motions have been processed in step 62, the control module 36 determines whether any at-hard-limit flags are set and the same motion has just been activated in step 66, in which case the corresponding reset-hard-limit flag is set in step 68. In other words, if a hard-limit is reached, an at-hard-limit flag is set, but if the same motion is then activated again, the hard-limit is reset. This permits manual activation of the motor 32 beyond a hard limit. The soft-limit routine ends in step 70.

Figure 3:
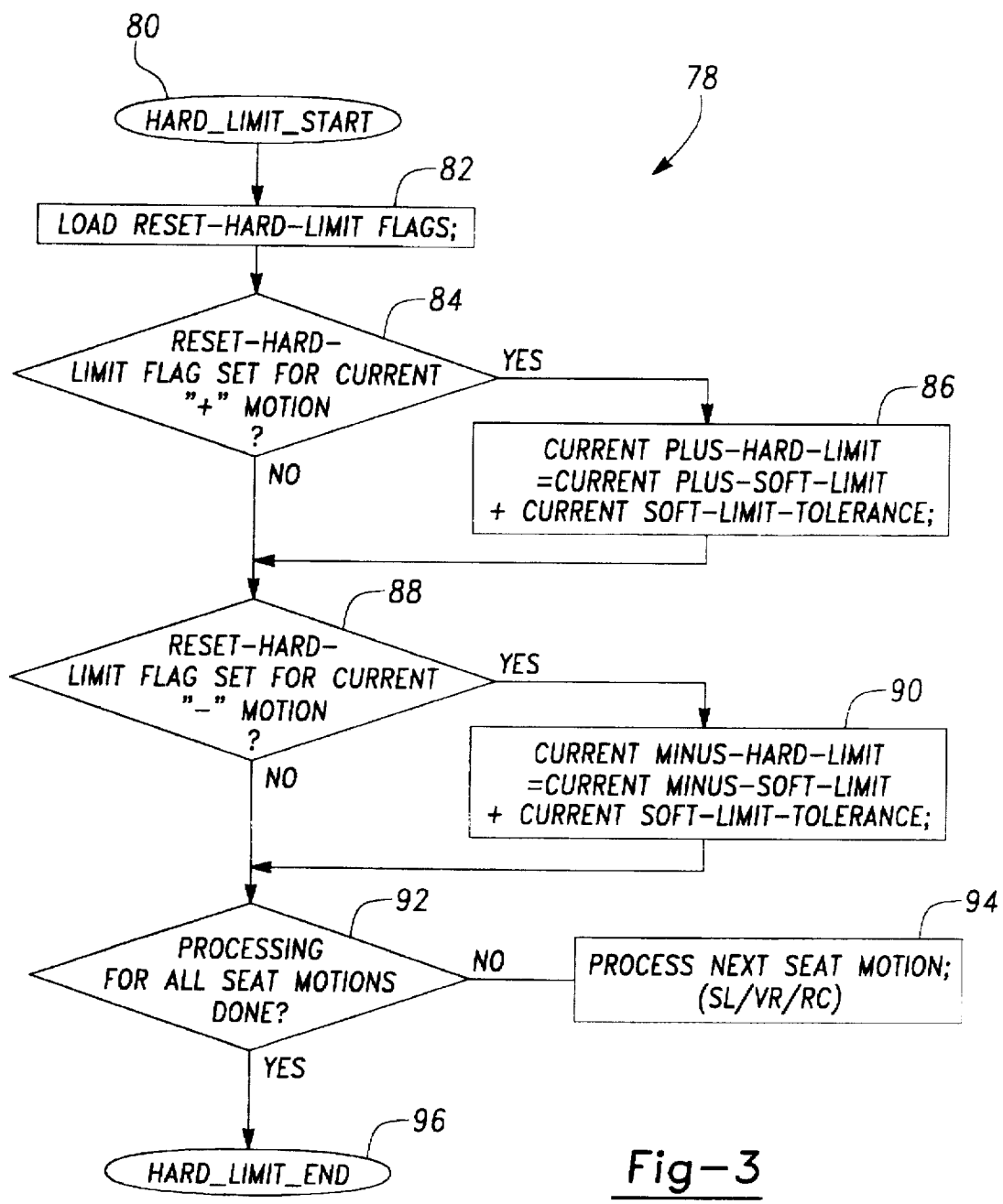
FIG. 3 is a flow chart indicating the operation of the control module of FIG. 1 in processing a hard-limit.

FIG. 3 illustrates operation of the control module 36 in the hard-limit routine 78, which starts in step 80. In step 82, the control module 36 loads the reset-hard-limit flags into a register. If the reset-hard-limit flag is set for the current (horizontal, vertical, recline) positive motion relative to the sensor 38, in step 84, a positive hard-limit is defined for that motion in step 86 as the current corresponding hard-limit plus a soft-limit tolerance margin, which would preferably correspond to a few millimeters of distance away from the travel limit.

In step 88, the reset-hard-limit flag for the negative motion is tested. If set, in step 90 the minus-hard-limit is defined as the corresponding soft-limit minus a soft-limit tolerance margin, again corresponding preferably to a few millimeters.

If processing for all seat motions is not done is step 92, the control module 36 processes the next seat motion in step 94 and returning to step 84. If the control module 36 has processed all seat motions, the hard limit routine 78 is ended in step 96.

For illustrative purposes, the operation of the vehicle seat system 20 will be described with respect to the horizontal motion only. Operation of the vertical motion and recline motion is identical. When the seat 22 is driven forwardly or rearwardly by the motor 32 and contacts a travel limit, such as a track limit 26, 28 or a temporary obstacle 39, motion of the seat 22 stops. If the motor 32 is activated for more than a first predetermined time interval, preferably two seconds, without any seat 22 motion detected by the sensor 38, the control module 36 indicates a hard stall condition. The hard stall condition is detected in step 46 and a soft-limit corresponding to horizontal motion in the forward direction is defined at the current position of the seat 22 in step 48. If subsequent movements of the seat 22 forwardly to the soft-limit result in the seat 22 movement ceasing for more than the second predetermined time interval, 300 milliseconds, a soft stall occurs. The corresponding soft-limit-count is incremented each time a soft stall occurs. After a predetermined number of soft stalls at the previously defined soft-limit, a hard-limit is defined at that position. Subsequently, as the seat approaches the hard-limit position, the control module 36 will cease activation of the motor 32 adjacent the hard-limit position, preferably a few millimeters away from the hard-limit position.

If the seat 22 is moved into contact with a temporary obstacle 39, a soft-limit is first defined at that position. Any previously defined hard-limit outside of the soft-limit is maintained. Subsequently, if the temporary obstacle 39 is removed before the predetermined number of soft stalls at the soft limits, the seat 22 moves through the soft-limit not initiating a soft-stall and the control module 36 deletes the previously stored soft-limit and proceeds towards the previously defined hard-limit.

If the temporary obstacle 39 is not removed before the predetermined number of soft stalls, the control module 36 defines a hard-limit adjacent the temporary obstacle. If the temporary obstacle 39 is later removed, the seat 22 will stop adjacent the previously defined hard-limit; however, by releasing the switch 34 and reactivating the switch 34, motion of the seat 22 will continue through the hard limit and the control module 36 will monitor the movement of the seat 22 for a hard stall, as described above.

The vehicle seat system 20 of the present invention reduces wear on the motor 32 and other seat components by first defining a soft stall condition in which the motor 32 will be deactivated more quickly if a stall has previously been detected. Further, the user will be less inconvenienced, since a temporary obstacle will usually not result in a hard-limit being set if the temporary obstacle 39 is removed before a predetermined number of soft stalls has occurred.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A vehicle seat system comprising:
   a seat movable along a path;
   a motor driving said seat on said path;
   a sensor generating a signal indicating the movement of said seat on said path;
   a controller activating said motor to move said seat along said path and receiving said signal from said sensor, said controller ceasing activation of said motor and defining a first soft limit when said sensor detects that said movement of said seat has stopped for a first predetermined time interval at a first position, said controller ceasing activation of said motor and defining a first hard limit when said sensor detects that said movement of said seat has stopped for a second predetermined time interval at said defined first soft limit, said second predetermined time interval less than said first predetermined time interval.

2. The vehicle seat system according to claim 1 wherein said controller ceases activation of said motor before said seat reaches said defined hard limit.

3. The vehicle seat system according to claim 1 further including a user-activated switch providing an input command to said controller instructing said controller to move said seat.

4. The vehicle seat system according to claim 1 wherein said controller detects that motion of said seat has stopped for said second predetermined time interval a plurality of times before defining said hard limit.

5. The vehicle seat system according to claim 1 wherein said controller ceases activation of said motor and defines a second soft limit when said sensor detects that said movement of said seat has stopped for said first predetermined time interval at a second position, said controller continuing activation of said motor and deleting said second soft limit when said sensor detects that said movement of said seat has not stopped for said second predetermined time interval at said defined second soft limit.

6. A method for controlling a vehicle seat system including the steps of:
   a) moving a seat along a path to a first position where said seat contacts a travel limit;
   b) detecting that movement of said seat has stopped at said first position on said path;
   c) defining a first soft limit at said first position based upon said step b);
   d) moving said seat along said path to said first soft limit and causing said seat to contact said travel limit;
   e) detecting that movement of said seat has stopped at said first soft limit;
   f) defining a first hard limit at said first soft limit based upon said step e);
   g) moving said seat along said path toward said first hard limit; and
   h) ceasing movement of said seat along said path before detecting that movement of said seat has stopped at said first position.

7. The method according to claim 6 further including the steps of:
   i) moving said seat along said path to a second position;
   j) detecting that movement of said seat has stopped at said second position;
   k) defining a second soft limit at said second position based upon said step j);
   l) moving said seat along said path to said second soft limit and past said second soft limit;
   m) detecting that movement of said seat did not stop at said second soft limit; and
   n) deleting said second soft limit based upon said step e).

8. The method according to claim 6 wherein said movement of said seat is ceased in said step h) before said seat contacts said travel limit.

9. The method according to claim 6 wherein said travel limit is a temporary obstacle.

10. The method according to claim 6 wherein said travel limit is a mechanical stop.

11. The method according to claim 6 wherein said steps d) and e) are performed a plurality of times before said step f).

12. The method according to claim 6 further including the step of ceasing movement of said seat along said path before said seat contacts said travel limit.

13. The method according to claim 6 wherein said step b) further includes the step of detecting that movement of said seat has stopped for a first predetermined time interval and said step e) further includes the step of detecting that movement of said seat has stopped for a second predetermined time interval less than said first predetermined time interval.

14. A method for controlling a vehicle seat system including the steps of:
   a) moving a seat along a path to a first position;
   b) detecting that movement of said seat has stopped at said first position on said path for a first predetermined time interval;
   c) defining a first soft limit at said first position based upon said step b);
   d) moving said seat along said path to said first soft limit;
   e) detecting that movement of said seat has stopped at said first soft limit for a second predetermined time interval less than said first predetermined time interval;
   f) ceasing movement of said seat along said path after said step e).

15. The method according to claim 14 further including the steps of:
   g) defining a first hard limit at said first soft limit based upon said step e); and
   h) moving said seat along said path toward said first hard limit;

i) ceasing movement of said seat along said path before said first hard limit.

16. A vehicle seat system comprising:

a seat moveable along a path;

a motor driving said seat on said path;

a sensor generating a signal indicating the movement of said seat on said path;

a controller receiving said signal from said sensor, said controller defining a first soft limit at a first position on said path based upon said controller detecting that movement of said seat has stopped at said first position for a first predetermined time interval based upon said signal from said sensor, said controller ceasing movement of said seat along said path upon detecting that movement of said seat has stopped at said first soft limit for a second predetermined time interval less than said first predetermined time interval based upon said signal from said sensor.

17. The vehicle seat system of claim 16, wherein said controller defines a first hard limit at said first soft limit when said controller detects that movement of said seat has stopped at said first soft limit for said second predetermined time interval, said controller ceasing movement of said seat along said path before said first hard limit.

* * * * *